United States Patent Office 3,431,321
Patented Mar. 4, 1969

3,431,321
WEATHER-RESISTANT UNSATURATED POLY-
ESTER RESIN COMPOSITION
Darwin Fiske De Lapp, New Canaan, Conn., and William
George Deichert, Flushing, N.Y., assignors to American Cyanamid Company, Stamford, Conn.
No Drawing. Filed July 22, 1965, Ser. No. 474,142
U.S. Cl. 260—872
Int. Cl. C08f 21/00; C08g 17/10
10 Claims

ABSTRACT OF THE DISCLOSURE

Substantially linear, water-insoluble, nongelled, unsaturated polyester resin compositions which can be converted to the cross-linked state and which comprise (1) the esterification reaction product of fumaric acid and a secondary, secondary isomer of a polypropylene glycol and (2) a glycol diacrylate and articles of manufacture produced therefrom, are disclosed.

One of the objects of the present invention is to produce a substantially linear, water-insoluble, nongelled, unsaturated polyester resin composition comprising a blend of (1) the esterification reaction product of fumaric acid and a polyproylene glycol and (2) a glycol diacrylate.

A further object of the present invention is to produce a hard, mar-resistant, cross-linked polyester resin product from the above polyester resin composition.

Still further, it is an object of this invention to produce articles of manufacture comprising a base member coated with the above hard, mar-resistant, cross-linked polyester resin.

These and other objects of the present invention will become more apparent to those skilled in the art upon reading the more detailed description set forth hereinbelow.

The compositions of matter of the present invention are composed essentially of the reaction product of fumaric acid and a polypropylene glycol. The first component is produced by reacting the fumaric acid and the glycol, which contains between about 6 and about 39 carbon atoms, until an acid number of below about 30 is achieved.

Among the polypropylene glycols which may be used to esterify the fumaric acid are dipropylene glycol, tripropylene glycol, tetrapropylene glycol, pentapropylene glycol, hexapropylene glycol, heptapropylene glycol, octapropylene glycol, nonapropylene glycol, decapropylene glycol, undecapropylene glycol, dodecapropylene glycol, tridecapropylene glycol and the like.

The preferred polypropylene glycols, preferred in that they impart a higher degree of weatherability to the resultant compositions than the other polypropylene glycols, are the secondary isomers of the above specified polypropylene glycols. These secondary isomers possess at least one terminal hydroxyl group on a secondary carbon atom. The secondary, secondary isomers possess two hydroxy groups, one on each terminal secondary carbon atom and may be produced by the method taught in an article by Sexton et al., J.A.C.S., vol. 75, page 4357, Sept. 5, 1953.

We have found that the polypropylene glycols generally, materially increase the mar-resistance of the instant compositions, however, the secondary isomers of these polypropylene glycols also simultaneously increase the weatherability thereof. This dual function of the isomers is unique and unexpected.

Examples of isomeric compounds we may use in the practice of our invention include the secondary isomer of dipropylene glycol and the secondary, secondary isomer of dipropylene glycol. Similarly, the secondary and secondary, secondary isomers of all of the above specified polypropylene glycols may be used herein.

The polypropylene glycols may be used singly or in combination with one another. The fumaric acid and the polypropylene glycol should be used in substantially equimolar proportions, however, for preferred processing results, a slight excess amounting to about 5 to 20% of the polypropylene glycol should be used over and beyond the amount stoichiometrically calculated to esterify substantially all of the carboxyl groups in the fumaric acid.

The second component of the novel compositions of the present invention is preferably a glycol diacrylate. These glycol diacrylates are generally prepared by esterifying and $\alpha,\beta$-ethylenically unsaturated monocarboxylic acid selected from the group consisting of acrylic acid and methacrylic acid with either a polyglycol having from 4 to 8 carbon atoms or a monoglycol having from 2 to 4 carbon atoms. Among the polyglycols which may be used to produce the glycol diacrylates are diethylene glycol, triethylene glycol, tetraethylene glycol, dipropylene glycol, bis(4-hydroxybutyl)ether and the like. Among the monoglycols which may be used to esterify the acrylic acids are ethylene glycol, propylene glycol, the propanediols-1,2 and 1,3, the butanediols-1,2; 1,3; and 1,4 and the like. These glycol diacrylates can be used with the glycol fumarates either singly or in combination with one another. However, whether used singly or in combination, the glycol diacrylate should be present in the total composition in an amount varying between about 10% and 40% by weight, based on the total weight of said glycol fumarate and said glycol diacrylate.

An alternative, although less preferred, second component used to prepare our novel compositions is a mixture of ethyl acrylate, allyl methacrylate and triallyl cyanurate. When utilizing this component, one should use between 60%, by weight, solids, and 90%, by weight, based on the weight of the total composition, of (1) and from about 40% by weight, to about 10% by weight, of the ethyl acrylate, allyl methacrylate and triallyl cyanurate monomers. Any amount of the three monomers may be used as long as at least 1% of each monomer is present to make up the 10%–40% of component (2). Trace amounts, i.e., up to about 5%, of such materials as phthalic acid, adipic acid, succinic acid, glacial methacrylic acid, etc., may also be tolerated.

In addition to the reaction product of the fumaric acid and polypropylene glycol blended with either the glycol diacrylates or the mixture of different polymerizable monomers, a third component (3) may be utilized in the composition. This third component is a polymerizable styrene and it may be used in amounts varying between 1% and 5%, by weight, based on the total weight of the composition. Among the polymerizable styrenes which may be used in the composition of the present invention are styrene per se, side chain and ring substituted halo and/or alkyl styrenes such as $\alpha$-chlorostyrene, $\alpha$-methylstyrene, o-, m-, p-methylstyrene, o-, m-, p-chlorostyrenes, 2,4-dimethylstyrene, 2,5-dimethylstyrene, 2,3-dichlorostyrene, 2,4-dibromostyrene, and the like. Since the presence of a halo substituent on a styrene compound may have a tendency to impart a slight yellowness to the ultimate cured object, these halo-substituted styrenes should be avoided, particularly when the ultimately produced object will be used in an area where clarity and water whiteness is desired.

The polypropylene glycol utilized to react with the fumaric acid is preferably used as the sole glycol in the resin composition. No other glycols should be used except in small amounts such as up to about 5%, based on the total weight of the glycols. An exception of this provision exists, however, with respect to 2-ethyl-1,3-hexanediol and neopentyl glycol, i.e., 2,3-dimethyl-1,3-propanediol. These two glycols may be utilized in amounts varying from 1 to about 50 mol percent, based on the total mols of glycol utilized.

It has been pointed out hereinabove that the substantially linear, water-insoluble, nongelled, unsaturated polyester resin compositions of the present invention can be converted to hard, mar-resistant products. This conversion from the ungelled or thermosetting state to the hard, thermoset state can be accomplished by the application of heat and/or pressure with or without catalysis. Still further, the thermosetting material can be converted to the thermoset state by use of catalysts or initiators only, without resorting to either heat or pressure. The catalytic materials or polymerization initiators which would be used to make such a conversion in state are well known in the art and have been used extensively for this purpose. Illustrative catalysts are the peroxide catalysts, such as, benzoyl peroxide, tertiary butyl hydroperoxide, di-tertiary butyl peroxide, and cumene hydroperoxide, among many others. The ketone peroxides may also be used, such as, the methyl ethyl ketone peroxide, the diethyl ketone peroxide and the like. The amounts of the catalytic material used will be conventional, such as, between about 0.01% and 10%, and more usually between about 0.1% and 3%, by weight, based on the weight of the polymerizable composition.

The polymerizable polyester resin compositions of the present invention will have utility in many areas such as in coatings, moldings, castings, and the like. One of the principal end uses for the polymerizable polyester resin compositions of the present invention is in the area of coating substrates that have a transparent characteristic in order to impart to said substrate a hard, mar-resistant surface. More particularly, the polymerizable polyester resin compositions of the present invention can be used to coat glass for window purposes or for television implosion shields, and the like. Additionally, one can use the polymerizable compositions of the present invention to coat lenses as in eyeglasses, including sunglasses, binoculars and telescopes and the like. Still further, these polymerizable compositions may be used to coat sheets of synthetic plastic materials, such as, sheets of polystyrene or poly(methylmethacrylate) and the like. If desired, the polyester resin compositions of the present invention may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principle desired in use namely, transparency, certain dyes and/or pigments may be dissolved in the unsaturated polymerizable polyester resin in order to achieve a tinting. Furthermore, the polyester resin compositions of the present invention can be rendered translucent or even opaque by use of the appropriate selection of filler and/or pigment in the desired kind and amount especially when being used as a coating for substrates such as wood, metal and opaque filled plastic articles.

The following examples are set forth for purposes of illustration only and are not meant to be construed as limitations on the present invention except as set forth in the appended claims. All parts and percentages are by weight unless otherwise specified.

EXAMPLE 1

Into a suitable reaction vessel equipped with thermometer, stirrer, inert gas inlet and outlet, there are introduced 1,743 parts of fumaric acid and 2,928 parts of tripropylene glycol. The charge is heated at about 220° C. for 22 hours while passing carbon dioxide gas through the reaction mixture so as to provide an inert atmosphere. At the end of the reaction period, the product, having an acid number of 18, is a light, yellow viscous liquid. 90 parts of this polyester resin are then blended with 10 parts of ethylene glycol dimethacrylate and 1 part of benzoyl peroxide. The solution is poured onto a sheet of glass to form a film. A sheet of poly(methyl methacrylate) is then placed over the resin solution and a second sheet of glass is positioned over the plastic sheet. The resulting sandwich is clamped together to squeeze out excess resin and prevent warping during the cure thereof. The total assembly is then heated at 100° C. for 1 hour, 120° C. for 1 hour and 130° C. for ½ hour. The assembly is then cooled to room temperature, the clamps are removed and the glass panels are separated from the plastic sheet. The coated poly(methyl methacrylate) sheet has the appearance to the naked eye of an uncoated sheet. Thickness of the coating is measured at 0.003 inch. The mar-resistant value on a Deichert-Webb mar-tester [1] is 3 and the Barcol hardness is 15. After 500 hours in a fluorescent ultraviolet weatherometer, the coating is substantially unaffected.

Following the procedure of Example 1, various polypropylene glycols were reacted with fumaric acid and the resultant product produced was blended with various glycol diacrylates or alternative components. The results are set forth in Table I, below.

TABLE I

| Ex. | Polypropylene glycol reacted with fumaric acid | Glycol diacrylate or alternative component | Other component | Deichert-Webb mar-resistance | Barcol hardness | Hours of exposure-weatherability |
|---|---|---|---|---|---|---|
| 2 | The sec., sec. isomer of dipropylene glycol. | Triethylene glycol dimethacrylate | None | 3 | 41 | 782 |
| 3 | Tetrapropylene glycol | Ethyl acrylate, allyl methacrylate, triallyl-cyanurate (60/24/20-parts). | do | 5 | 10 | 423 |
| 4 | Octapropylene glycol | Tetraethylene glycol dimethacrylate | Styrene, 20 parts | 3 | 5 | 325 |
| 5 | Dipropylene glycol | do | Glacial methacrylic acid, 5 parts. | 3 | 39 | 420 |
| 6 | Decapropylene glycol | Triethylene glycol dimethacrylate | None | 2 | 0 | 232 |
| 7 | Tridecapropylene glycol | Polyethylene glycol dimethacrylate | α-Methyl styrene, 15 parts. | 4 | 0 | 232 |
| 8 | The sec. isomer of tripropylene glycol. | Triethylene glycol diacrylate | None | 3 | 19 | 470 |
| 9 | The sec., sec. isomer of tetrapropylene glycol. | Ethylene glycol dimethacrylate | do | 2 | 9 | 672 |
| 10 | 50/50 mixture of tripropylene glycol and neopentyl glycol. | Diethylene glycol diacrylate | do | 5 | 31 | 272 |
| 11 | 50/50 mixture of 1,2-hexanediol and the sec., sec. isomer of dipropylene glycol. | Polyethylene glycol diacrylate | do | 6 | 24 | 921 |

[1] The mar tests referred to herein are accomplished in the following manner: A spring-loaded cylinder presses a disc of abrasive paper (attached by double-faced masking tape) against the plastic surface with a fixed presure while the cylinder and disc are rotated manually for one revolution. The rotation is usually made in a 3–5 second period. The number of rings which can be seen with the unaided eye under approximately optimum observing conditions is a measure of sensitivity to marring. The clear samples are examined by placing them slightly off the line from a strong light source and about 10″ from the eye.

We claim:
1. A substantially linear, water-insoluble, nongelled, unsaturated polyester resin composition consisting essentially of a blend of (1) the polymeric esterification reaction product of reactants consisting essentially of fumaric acid and a glycol selected from the group consisting of (A) a secondary, secondary isomer of a polypropylene glycol having between 6 and 39 carbon atoms, (B) those of (A) and up to 5%, based on the total weight of the glycols, of another glycol, and (C) those of (A) and up to 50%, by weight, based on the total weight of the glycols, of neopentyl glycol or 2-ethyl-1,3-hexanediol, said product having an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2).

2. A hard, mar-resistant, cross-linked, unsaturated polyester resin composition consisting essentially of the cured reaction product of (1) the polymeric esterification reaction product of reactants consisting essentially of fumaric acid and a glycol selected from the group consisting of (A) a secondary, secondary isomer of a polypropylene glycol having between 6 and 39 carbon atoms, (B) those of (A) and up to 5%, based on the total weight of the glycols, of another glycol, and (C) those of (A) and up to 50%, by weight, based on the total weight of the glycols, of neopentyl glycol or 2-ethyl-1,3-hexanediol, said product having an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2).

3. A sheet of poly(methyl methacrylate) having bonded thereto a hard, mar-resistant, cross-linked, unsaturated polyester resin composition consisting essentially of the cured reaction product of (1) the polymeric esterification reaction product of reactants consisting essentially of fumaric acid and a glycol selected from the group consisting of (A) a secondary, secondary isomer of a polypropylene glycol having between 6 and 39 carbon atoms, (B) those of (A) and up to 5%, based on the total weight of the glycols, of another glycol, and (C) those of (A) and up to 50%, by weight, based on the total weight of the glycols, of neopentyl glycol or 2-ethyl-1,3-hexanediol, said product having an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40%, by weight, based on the total weight of (1) and (2).

4. A composition of matter according to claim 1 wherein said polypropylene glycol is the secondary, secondary isomer of dipropylene glycol.

5. A composition according to claim 2 wherein said polypropylene glycol is the secondary, secondary isomer of dipropylene glycol.

6. A sheet according to claim 3 wherein said polypropylene glycol is the secondary, secondary isomer of dipropylene glycol.

7. A composition according to claim 1 containing (3) from about 1% to about 5%, by weight, based on the total weight of said composition, of a polymerizable styrene.

8. A composition according to claim 2 containing (3) from about 1% to about 5%, by weight, based on the total weight of said composition, of a polymerizable styrene.

9. A sheet according to claim 3 containing (3) from about 1% to about 5%, by weight, based on the total weight of said composition, of a polymerizable styrene.

10. A composition according to claim 1 wherein said esterification reaction product contains up to about 5% of an acid selected from the group consisting of phthalic acid, adipic acid, succinic acid, and glacial methacrylic acid.

References Cited
UNITED STATES PATENTS

| | | | |
|---|---|---|---|
| 3,222,421 | 12/1965 | Lundberg | 260—872 |
| 3,265,763 | 8/1966 | Deichert et al. | 260—872 |
| 3,265,764 | 8/1966 | Deichert et al. | 260—872 |

MURRAY TILLMAN, *Primary Examiner.*

JOHN T. GOOLKASIAN, *Assistant Examiner.*

U.S. Cl. X.R.

260—75, 861